United States Patent
Gibbons et al.

(10) Patent No.: US 6,243,809 B1
(45) Date of Patent: Jun. 5, 2001

(54) METHOD OF FLASH PROGRAMMING OR READING A ROM OF A COMPUTER SYSTEM INDEPENDENTLY OF ITS OPERATING SYSTEM

(75) Inventors: Patrick L. Gibbons, Magnolia; Paul J. Broyles, III, Cypress, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/070,823

(22) Filed: Apr. 30, 1998

(51) Int. Cl.[7] .................................................. G06F 9/00
(52) U.S. Cl. ................................. 713/1; 713/100
(58) Field of Search ........................ 713/1, 100

(56) References Cited

U.S. PATENT DOCUMENTS

| 5,339,437 |   | 8/1994  | Yuen ........................... 395/700    |
|-----------|---|---------|--------------------------------------------|
| 5,375,243 | * | 12/1994 | Parzych et al. ............... 710/200     |
| 5,684,997 | * | 11/1997 | Kau et al. .................... 710/260    |
| 5,724,027 |   | 3/1998  | Shipman et al. .............. 340/825.31   |
| 5,724,544 | * | 3/1998  | Nishi .......................... 711/115   |
| 5,796,984 | * | 8/1998  | Pearce et al. ................. 713/1      |
| 5,809,515 | * | 9/1998  | Kaki et al. .................... 711/103   |
| 5,835,594 | * | 11/1998 | Albrecht et al. ............... 380/23     |
| 5,835,760 | * | 10/1998 | Harmer ......................... 713/2     |
| 5,859,911 | * | 1/1999  | Angelo et al. ................. 380/25     |
| 5,898,843 | * | 4/1999  | Deceased et al. ............... 360/39     |
| 5,956,743 | * | 9/1999  | Bruce et al. ................... 711/103   |
| 5,963,738 | * | 10/1999 | Yamaki et al. ................. 713/100    |
| 6,009,520 | * | 12/1999 | Gharda ......................... 713/1     |
| 6,009,524 | * | 12/1999 | Olarig et al. .................. 713/200   |

OTHER PUBLICATIONS

Advanced Micro Devices, Inc., "Am291F002T/Am29F002B, 2 Megabit (262,144×8–Bit) CMOS 5.0 Volt–only, Sector Architecture, Flash Memory,"© 1996, pp. 1–34.

Intel Corporation, Intel486™ SL Microprocessor SuperSet Programmer's Reference Manual, System and Power Management, pp. 6–28 through 6–53.

Intel Corporation, Pentium™ Processor User's Manual, vol. 3: Architecture and Programming Manual, © Intel Corporation 1994, pp. 20–1 through 20–9.

* cited by examiner

Primary Examiner—Robert Beausoleil
Assistant Examiner—Rita Ziemer
(74) Attorney, Agent, or Firm—Akin, Gump, Strauss, Hauer & Feld, LLP

(57) ABSTRACT

A computer system provides for flashing a non-volatile memory image to a non-volatile memory and reading data from a non-volatile memory independently of an operating system. An image buffer is allocated in a volatile memory of the computer system. If flashing a non-volatile memory image to the non-volatile memory is desired, the image buffer is loaded with a portion of the non-volatile memory image. BIOS interface code is then called to place an SMI event code into a memory and to generate a system management interrupt causing the computer system to enter a system management mode. SMI handler code examines the SMI event code and calls SMI service code. Next, the image buffer is located and the portion of the non-volatile memory in the image buffer is flashed to the non-volatile memory by the SMI service code. Locating the image buffer may include locating an image header defined within the volatile memory. The image header may include a password for providing access to the non-volatile memory. The steps of loading the image buffer, calling BIOS interface code, and flashing a portion of the non-volatile memory image to the non-volatile memory may be repeated until the entire non-volatile memory image is flashed to the non-volatile memory. Alternatively, if reading data from a non-volatile memory independently of an operating system is desired, a system management interrupt is generated to place the computer system in a system management mode, an SMI event code is placed in a memory, the SMI handler code processes the SMI event code and calls SMI service code, the image buffer is located by the SMI service code, and the SMI service code copies data from the non-volatile memory to the image buffer.

29 Claims, 9 Drawing Sheets

METHOD OF FLASH PROGRAMMING OR READING A ROM OF A COMPUTER SYSTEM INDEPENDENTLY OF ITS OPERATING SYSTEM

BACKGROUND OF THE INVENTION

1. Field of the Invention

The present invention relates to flashing and reading a non-volatile memory, and more particularly to flashing and reading a read-only memory of a computer system independently of its operating system.

2. Description of the Related Art

Access to flash ROM devices in a computer system is increasingly being safeguarded by software and/or hardware protection and virtualization mechanisms. Such mechanisms, which range from block locking and write protection to password protection and secure memory devices, may be traversed by devices having the necessary privilege level. In a computer system, an application is typically given the lowest privilege level. An application requiring direct access to a flash ROM device, such as software for flashing a ROM image or for reading a version of a ROM, thus must be able to direct a device having the necessary privilege level to release security protection for the flash ROM device. Similarly, access to certain areas of a memory space of a computer system, such as high regions of memory where critical code is often stored, has required a particular privilege level.

Software for flashing a ROM image or for reading a version of a ROM has traditionally relied upon a driver to obtain a privilege level necessary to release any security protection for a flash ROM device and to access certain areas of a memory space. Drivers (also called device drivers), which generally serve to link a peripheral device to an operating system, are commonly used in programming and reading flash ROM devices in a computer system. In particular, a driver is typically used to control command and status registers of a flash ROM device for erasing, writing, or reading the device. Various types of information may be read from a flash ROM device, such as status data, ROM version data, device identification data, or a ROM image. Accessing a flash ROM device to read or write data has occurred exclusively in an operating system environment.

Accessing a flash ROM device in an operating system environment, however, has required updates to drivers for each hardware and operating system environment in which access to a flash ROM device is desired. Such updates, for example, may account for definitions of new bus interface standards and new memory standards. Drivers are also frequently updated to handle new ROM versions of application software, new device identification codes, or new memory size boundaries. It has been necessary, therefore, to match maintenance of a driver for accessing a flash ROM device with the frequency of changes in the hardware environment of the flash ROM device, the operating system environment, and ROM versions.

Most of today's computer systems provide an operating state known as a protected mode which supports advanced features. A protected mode has provided hardware support for multitasking and virtual memory management. At certain times in a protected mode, however, an operating system has been unable to grant a driver the privilege level necessary to release security protection for a flash ROM device. An application thus has not been guaranteed access to a flash ROM device when a computer system is in a protected mode.

SUMMARY OF THE INVENTION

Briefly, the present invention provides a method of flashing a non-volatile memory image to a non-volatile memory of a computer system and reading data from a non-volatile memory independently of an operating system. An image buffer is allocated in a volatile memory of the computer system. If flashing a non-volatile memory image to the non-volatile memory is desired, the image buffer is loaded with a portion of the non-volatile memory image. BIOS interface code is then called to place an SMI event code into a memory and to generate a system management interrupt causing the computer system to enter a system management mode.

In the system management mode, an SMI handler code examines the SMI event code and calls SMI service code. Next, the SMI service code locates the image buffer, and the portion of the non-volatile memory in the image buffer is flashed to the non-volatile memory. Locating the image buffer may include locating an image header defined within the volatile memory. The image header may include a password for providing access to the non-volatile memory. The steps of loading the image buffer, calling BIOS interface code, and flashing a portion of the non-volatile memory image to the non-volatile memory may be repeated until the entire non-volatile memory image is flashed to the non-volatile memory. Alternatively, if reading data from a non-volatile memory independently of an operating system is desired, a system management interrupt is generated to place the computer system in a system management mode, the image buffer is located, and data from the non-volatile memory is copied to the image buffer.

The present invention further provides a method of providing a memory command to a non-volatile memory having a locked state independently of the operating system. The computer system is placed in a system management mode, and an SMI event code is placed into a memory. The SMI handler code processes the SMI event code and calls the SMI service code. Next, an image buffer and image header are located in a volatile memory of the computer system. The image header is then read, and a password is provided from the image header to a secure memory device. If the password provided matches the password stored in the secure memory device, the secure memory device places the non-volatile memory in an unlocked or unprotected state. A protected command may then be provided from the image header to the non-volatile memory by the SMI service code.

The non-volatile memory or a volatile memory of the computer system stores a driver for performing the method of flashing a non-volatile memory image to the non-volatile memory and reading from a non-volatile memory independent of an operating system. The BIOS interface code, SMI handler code, and SMI service code are also stored in the non-volatile memory or a volatile memory. In a system management mode, the SMI service code operates at a high privilege level which gives the SMI service code access to the non-volatile memory and the full memory space of the computer system. In accordance with the present invention, reading or flashing non-volatile memory thus is not dependent upon the operating system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patent applications are hereby incorporated by reference as if set forth in their entirety:

Common-assigned U.S. patent application Ser. No. 08/396,343, entitled "SECURITY CONTROL FOR PERSONAL COMPUTER," filed on Mar. 3,1995;

Commonly-assigned U.S. patent application Ser. No. 09/070,458, entitled "METHOD AND APPARATUS FOR PROVIDING REMOTE ACCESS TO SECURITY FEATURES ON A COMPUTER NETWORK," filed on Apr. 30, 1998, Commonly assigned U.S. patent application Ser. No. 09/070,866, entitled "METHOD AND APPARATUS FOR FLASHING ESCD AND VARIABLES INTO A ROM," filed on Apr. 30, 1998; and Commonly assigned U.S. patent application Ser. No. 09/,070,942, entitled "METHOD AND APPARATUS FOR REMOTE ROM FLASHING AND SECURITY MANAGEMENT FOR A COMPUTER SYSTEM," filed on Apr. 30, 1998.

Figure 1:
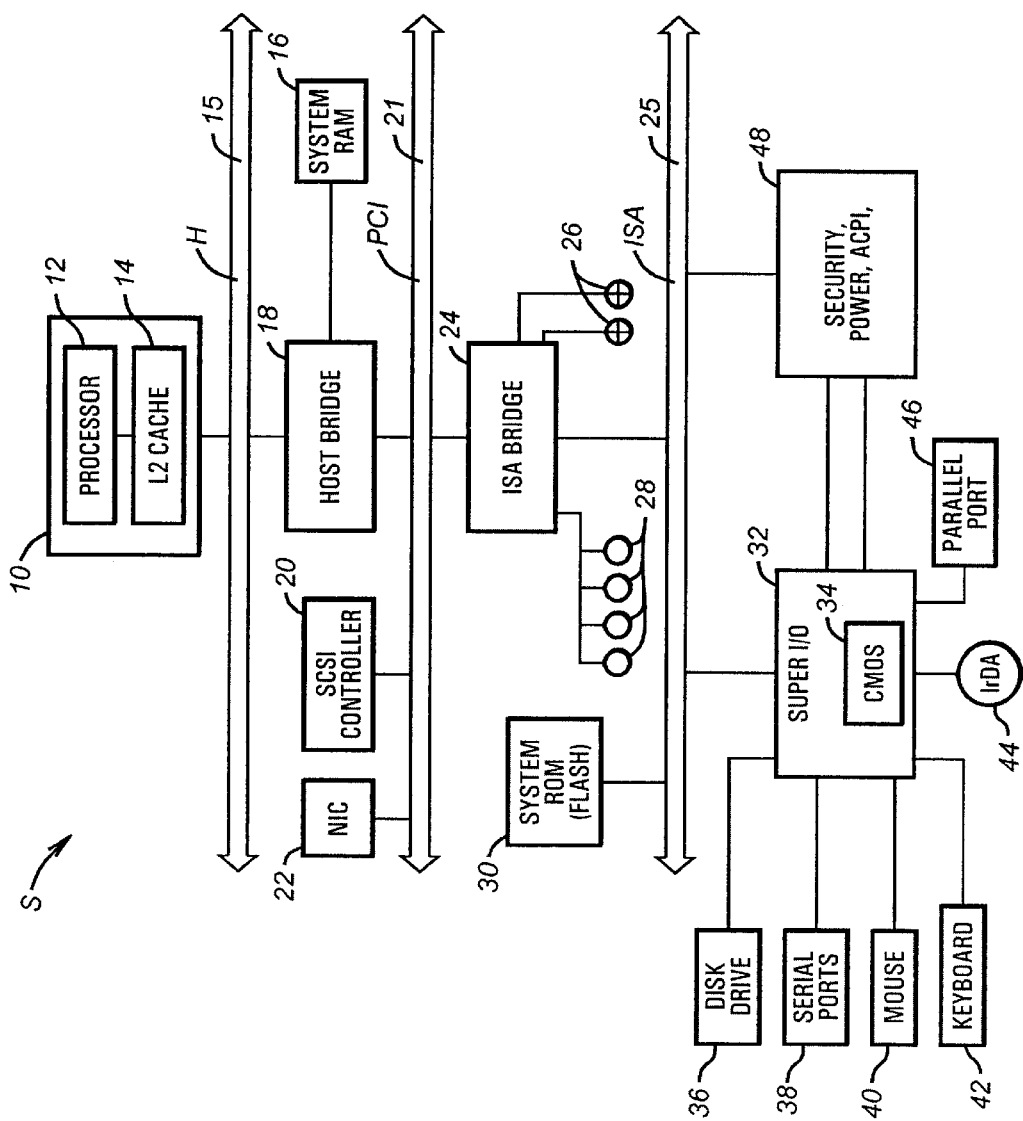
FIG. 1 is a schematic diagram of a computer system incorporating flash ROM security features in accordance with the present invention.

Turning to FIG. 1, illustrated as a typical computer system S implemented according to the present invention. While this system is illustrative of one embodiment, the techniques according to the present invention can be implemented in a wide variety of systems. The computer system S in the illustrated embodiment is a PCI bus/ISA bus based machine, having a peripheral component interconnect (PCI) bus 21 and an industry standard architecture (ISA) bus 25. The PCI bus 21 is controlled by PCI controller circuitry within a host bridge 18. The host bridge 18 couples the PCI bus 21 to a host bus 15. The disclosed host bridge 18 includes interface circuitry for a system random access memory (RAM) 16. The system RAM 16 preferably supports extended data out (EDO), dynamic random access memory (DRAM) and synchronous DRAM (SRAM). An ISA bridge 24 bridge is between the PCI bus 21 and the ISA bridge 25. The host bus 15 is coupled to a processor module 10 which includes a microprocessor core 12 and a level 2 (L2) cache 14.

The ISA bridge 24 includes an integrated IDE controller for controlling up to four enhanced IDE drives 28 and a universal serial bus (USB) controller for controlling USB ports 26. The ISA bridge 24 also includes enhanced power management. The enhanced power management within the ISA bridge 24 includes full clock control, device management, suspend and resume logic, advanced configuration and power interface (ACPI), and system management bus (SMBus) control, which implement the inter-integrated circuit ($I^2C$) control. The ISA bridge 24 supports standard personal computer input/output (I/O) functions, including a dynamic memory access (DMA) controller, interrupt controllers, a timer, and a real time clock (RTC).

The PCI bus 21 couples a variety of devices that generally take advantage of a high speed data path. This includes a small computer system interface (SCSI) controller 20 and a network interface controller (NIC) 22. The NIC 22 preferably supports the THUNDERLAN™ power management specification by Texas Instruments.

The ISA bus 25 couples the ISA bridge 24 to a Super I/O chip 32, which in the disclosed embodiment is a National Semiconductor Corporation PC87307VUL device. This Super I/O chip 32 provides a variety of input/output functionality, including a disk drive controller for a disk drive 36, serial ports 38, a mouse port for a mouse 40, a keyboard controller for a keyboard 42, a parallel port 46, and an IrDA port 44. These devices are coupled through connectors to the Super I/O chip 32. The Super I/O chip 32 preferably includes a battery-backed memory 34 such as a CMOS memory for storage of passwords supported by the computer system S.

The ISA bus 25 is further coupled to a system ROM 30 (FIGS. 2 and 3) implemented as flash read-only memory. The system ROM 30 includes basic input/output services (BIOS) code for execution by the processor 12. The ISA bus 25 couples the ISA bridge 24 to a security, power, ACPI, and miscellaneous application specific integrated circuit (ASIC) 48, which provides a variety of miscellaneous functions for the computer system S. The ASIC 48 includes security features, system power control, light emitting diode (LED) control, a PCI arbiter, remote wakeup logic, system fan control, hood lock control, ACPI registers and support, system temperature control, and various glue logic.

Figure 2:
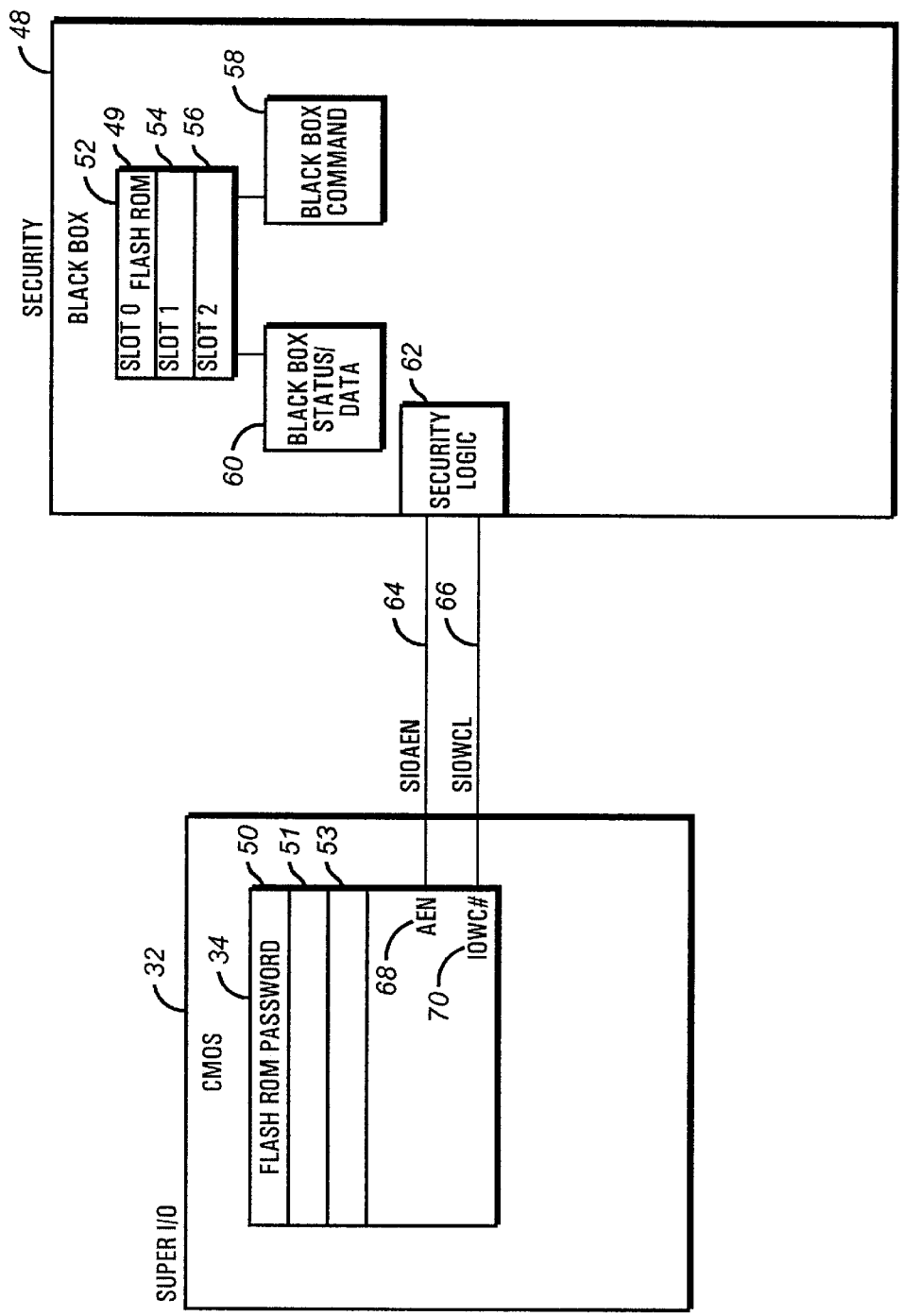
FIG. 2 is a schematic diagram of a Super I/O chip and a security chip for flash ROM security management in accordance with the present invention.

Referring to FIG. 2, the contents of the Super I/O chip 32 and security ASIC 48 for use with the present invention are shown. The CMOS memory 34 within the Super I/O chip 32 includes a CMOS location 50 for storing a flash ROM password. The flash ROM password controls access to the system ROM 30. CMOS memory 34 may also include a CMOS location 51 for storing a user power-on password and a CMOS location 53 for storing an administrator password. In the disclosed embodiment, the flash ROM password is the administrator password. Access to the CMOS locations 50, 51 and 53 is controlled by an AEN signal 68 externally designated as SIOAEN 64, and an IOWC# signal 70 externally designated as SIOWCL 66. It should be understood that components within the Super I/O chip 32 which are not related to the present invention have been omitted.

The security ASIC 48 includes a "black box" 52. The black box 52, which is a secure memory device for locking and unlocking resources within the computer system S such as the system ROM 30, is coupled to a black box status/data register 60 and a black box command register 58. In the disclosed embodiment, the black box 52 provides three slots: Slot 0, Slot 1, and Slot 2, respectively. Slot 0 indicated at 49 is used to store the flash ROM password for locking and unlocking the system ROM 30. When the system ROM 30 is in a locked state, write cycles to the system ROM 30 are blocked. When the system ROM 30 is in an unlocked state, write cycles and read cycles to the system ROM 30 are permitted. Slot 1 indicated at 54 may be used for storing the user power-on password, and Slot 2 indicated at 56 may be used for storing the administrator password.

In the disclosed embodiment, the blackbox command register 58 is a 7-bit I/O mapped register. Bits 7–5 are index bits allowing for selection of a particular slot of the black box 52. A command provided to the blackbox command register 58 is directed to the particular slot selected. Bit 4 is preferably reserved and therefore should return a "0" when read. Bits 3–0 are used for storing a blackbox command provided to the blackbox command register 58. The command sequence '0000' represents a Read Status blackbox command. The Read Status blackbox command causes the next byte read from the blackbox status/data register 60 to be the status of the black box 52. The command sequence '0001' represents the Store Password blackbox command. Following the Store Password blackbox command, the next 8 bytes written to the blackbox status/data register 60 are stored as the password. The command sequence '0010' represents the Protect Resources blackbox command. The Protect Resources blackbox command locks a selected blackbox slot. The command sequences '0100' represents the Access Resources blackbox command. The Access Resources blackbox command compares the next 8 bytes written to the status/data blackbox register 60 with the password bytes previously stored in the selected blackbox slot using the Store Password blackbox command. If each byte is the same, then the Access Resources command unlocks the selected blackbox slot. The command sequence '1000' represents the Permanently Locked Resource blackbox command. The Permanently Locked Resource blackbox command prohibits access to the selected blackbox slot until the security ASIC 48 is reset. Blackbox commands are provided to the blackbox command register 58 by BIOS code.

Further, in the disclosed embodiment, the blackbox status/data register 60 is an 8-bit I/O mapped register. For a write operation, bits 7–0 represent the password byte, while the blackbox status/data register 60 serves as a data register for a write operation, the blackbox status/data register 60 serves as a status register for a read operation. Referring to a read operation, bits 7–5 represent index bits for selection of a particular slot of the black box 52. Bits 4–3 are reserved and therefore should return a '0' if read. Bit 2 indicates whether a selected slot is permanently locked. If a '1' is stored in bit 2, the selected slot is permanently locked, and if a '0' is stored in bit 2, the selected slot is not permanently locked. Bit 1 indicates whether there is a delay in progress. A delay in progress occurs when there is a password mismatch. If there is a password match, there is no delay in progress. In the disclosed embodiment, a '1' refers to a delay in progress, and a '0' refers to the absence of a delay in progress.

The 0 bit indicates whether the selected slot is protected or unprotected. If a '1' is stored in the 0 bit, the selected slot is protected, and if a '0' is stored in bit 0, the selected slot is unprotected. Further details concerning the operation of the black box 52, the blackbox command register 58, and the blackbox status/data register 60 are provided in commonly-assigned U.S. patent application Ser. No. 08/396,343, entitled "SECURITY CONTROL FOR PERSONAL COMPUTER," and commonly-assigned U.S. patent application Ser. No. 9/070,458., entitled "METHOD AND APPARATUS FOR PROVIDING REMOTE ACCESS TO SECURITY FEATURES ON A COMPUTER NETWORK," previously incorporated by reference. It should be understood that the number of bits and bytes in the particular bit sequences and register sizes as described may be varied to achieve other embodiments of the black box 52.

The security ASIC 48 also includes security logic 62 for controlling the SIOAEN signal 64 and the SIOWCL signal 66. If the security logic 62 asserts the SIOAEN signal 64, blockage of write operations to the password CMOS locations 50, 51 and 53 occurs. If the security logic 62 asserts the SIOWCL signal 66, both writes and reads are blocked to the password CMOS locations 50, 51 and 53. If both the SIOAEN signal and the SIOWCL signal 66 are deasserted, read and write cycles to the password CMOS locations 50, 51 and 53 may be decoded. BIOS code in connection with the security chip 48 and the Super I/O chip 32 thus controls access to the flash ROM password used for locking and unlocking the system ROM 30.

Figure 3A:
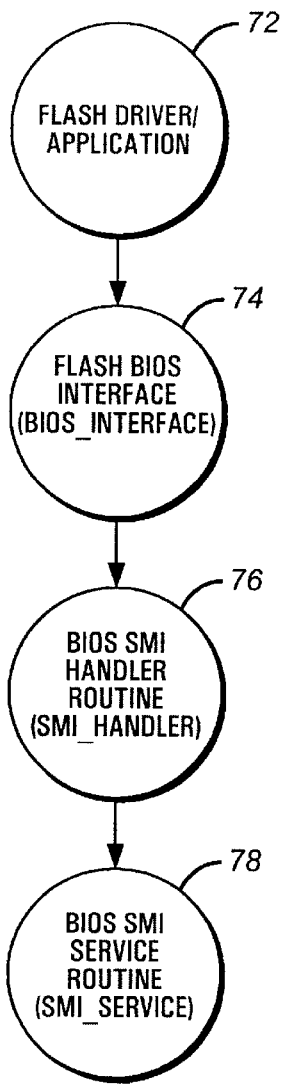
FIG. 3A is a control flow diagram of a ROM flashing and reading process in accordance with the present invention.
Figure 3B:
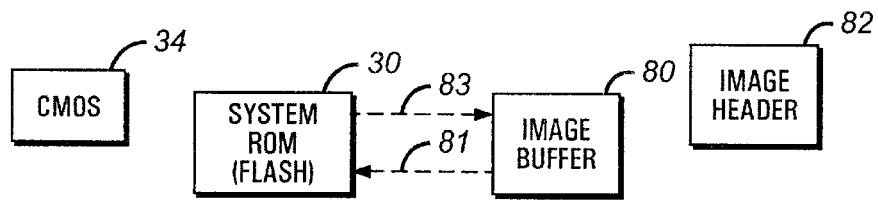
FIG. 3B is a data flow diagram of the ROM flashing and reading process of FIG. 3A.

Referring to FIG. 3A, a control flow diagram of a process for flashing and reading the system ROM 30 in accordance with the present invention is shown. Referring to FIG. 3B, a data flow diagram of the process for flashing and reading the system ROM 30 is shown. The solid-line arrows depicted represent control flow (FIG. 3A), and the phantom line arrows depicted represent data flow (FIG. 3B). The components in FIG. 3A represent software for the disclosed embodiment, and the components in FIG. 3B represent hardware for the disclosed embodiment. In accordance with the present invention, at boot up of the computer system S, the system ROM 30 includes in its contents a flash driver or application 72, a flash BIOS interface 74, a BIOS SMI handler routine 76, and a BIOS SMI service routine 78. During runtime, the system RAM 16 includes the flash driver 72, a flash BIOS interface 74, the BIOS SMI handler routine 76, and the BIOS SMI service routine 78. It should be understood that the flash driver 72, the flash BIOS interface 74, the BIOS SMI handler routine 76, and the BIOS SMI service routine 78 may be contained in a volatile memory, non-volatile memory or any medium suitable for storing code to be executed by a processor.

The flash driver 72 allocates an image buffer 80 and an image header 82 in the system RAM 16. The image header 82 contains a variety of information for performing a ROM command using the image buffer 80. The flash driver 72 next calls the flash BIOS interface 74. The flash BIOS interface 74 places an SMI event code into the CMOS memory 34 and then generates a system management interrupt (SMI). The SMI causes the processor 12 to place the computer system S in a system management mode (SMM). Entering SMM transfers control directly from the flash BIOS interface 74 to the BIOS SMI handler routine 76. The SMI handler routine 76 examines the SMI event code in the CMOS memory 34. The SMI event code directs the BIOS SMI handler 76 to call the BIOS SMI service routine 78.

The BIOS SMI service routine 78 locates the image header 82 and processes the information in the image header 82. If the ROM command is a flash command, the image buffer 80 is filled with a portion of a ROM image to be flashed to the system ROM 30. The BIOS SMI service routine 78 then executes the particular ROM command. For a flash command, a ROM image is provided from the image buffer 80 to the system ROM 30 as indicated by phantom-line arrow 81. For a read command, data is provided from the system ROM 30 to the image buffer 80 as indicated by phantom-line arrow 83. Flashing and reading the system ROM 30 from SMM allows for ROM flashing and reading independently of the runtime environment of the computer system S. After the system ROM 30 is flashed or read, the BIOS SMI routine 78 returns the processor 12 back to its normal operating mode. This overall process may be repeated a number of times in order to iteratively flash or read the system ROM 30.

Figure 4A:
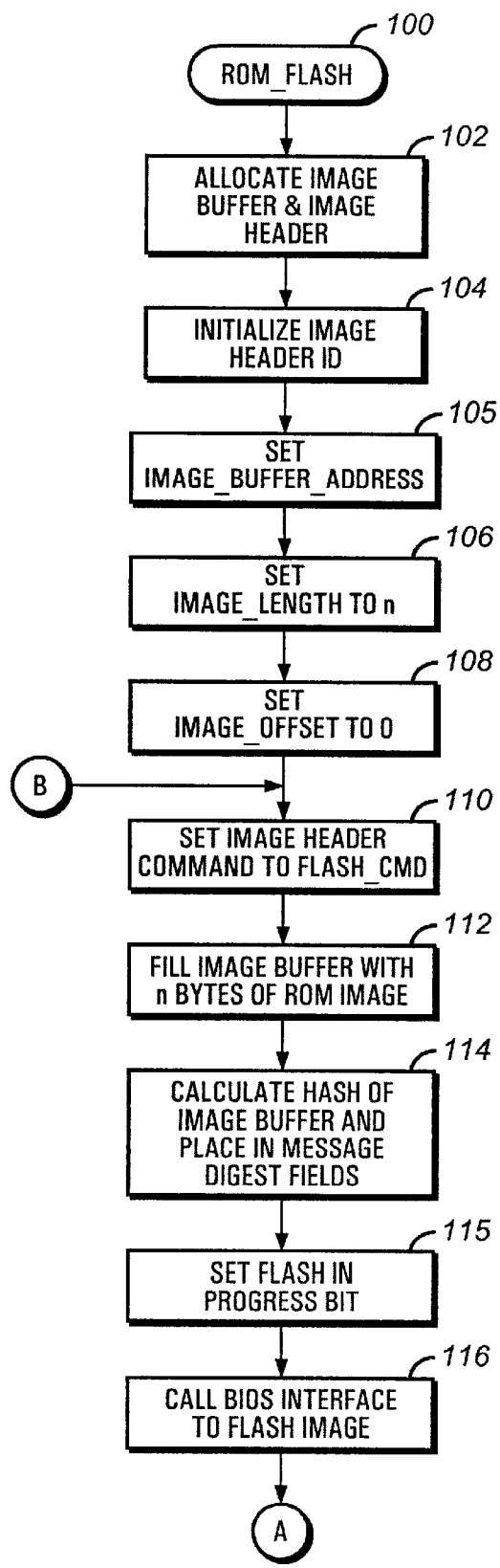
FIGS. 4A and 4B are flow charts of an exemplary ROM_FLASH routine in accordance with the present invention.
Figure 4B:
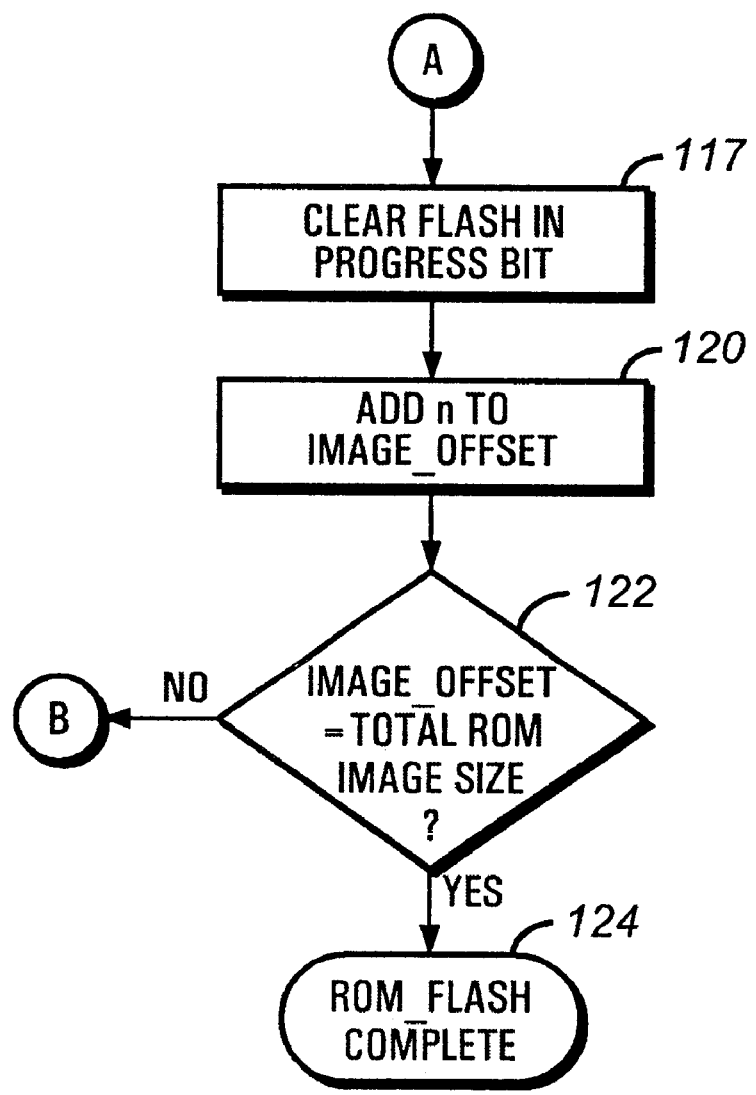

Referring to FIGS. 4A and 4B, an exemplary ROM_FLASH routine 100 for executing a ROM flash process in accordance with the present invention is shown. The ROM_FLASH routine 100 is performed in the flash driver 72 (FIG. 3A). Beginning at step 102, the image buffer 80 and the image header 82 (FIG. 3B) are allocated in the system RAM 16. In the disclosed embodiment, the image buffer 80 is a physically contiguous memory area. The size of the image buffer 80 may be equal to or less than the size of a ROM image to be flashed. The image header 82 contains several fields of data for use in performing a flash or read of the system ROM 30. An exemplary structure for the image header 82 is defined below:

```
struct image_header
{
    unsigned long header_id_lo;
    unsigned long header_id_hi;
    unsigned long image_buffer_address;
    unsigned long image_offset;
    unsigned long image_length;
    unsigned short command;
    unsigned short result;
    unsigned long password_lo;
    unsigned long password_hi;
    unsigned long msg_digest_0;
    unsigned long msg_digest_1;
    unsigned long msg_digest_2;
    unsigned long msg_digest_3;
};
```

The header_id_lo and header_id_hi fields or parameters hold the image header signature or ID representing the beginning of the image header 82. The image_buffer_address parameter is a physical pointer to the image buffer 80 used to locate the image buffer 80. The image_offset parameter is an offset into the system ROM 30 to which the image buffer 80 corresponds. The image_offset parameter is used to associate a selected region of the image buffer 80 with a selected region of the system ROM 30. The image_length parameter is the length of the image buffer 80. Flashing or reading the entire ROM 30 versus a part of the ROM 30 is a function of the image_length field. The image_length parameter is used for determining when the contents of the image buffer 80 are completely filled by a read operation or completely emptied by a flash operation. The command parameter specifies the action to be taken with respect to the system ROM 30. The result parameter is a return code which is set to 0 if no errors occur. If the result parameter is set to ERROR, either an invalid command was provided or the selected command was not executed. The password_lo and password_hi represent an 8-byte password for locking and unlocking the system ROM 30, such as an administrator password. In the disclosed embodiment, the msg_digest_0, msg_digest_1, msg_digest_2, and msg_digest_3 parameters hold a MD5 message digest of the image buffer 80. These message digest fields are optional fields of the image header 82. Further, in the disclosed embodiment, the image header 82 is DWORD aligned.

From step 102, control proceeds to step 104 where the image header ID is initialized. In the disclosed embodiment, the header_id_lo parameter is set to 524F4D representing the string "ROMI," and the header_id_hi parameter is set to 4D41745 representing the string "MAGE." Control next proceeds to step 105 where the image_buffer_address parameter is set to the physical address of the image buffer 80. From step 105, control passes to step 106 where the image_length parameter is set to n, a variable representing an integer. Following step 106, the image_offset parameter is set to 0 at step 108. Control then proceeds to step 110 where the command parameter is set to FLASH_CMD representing a command to perform a flash operation. Next, in step 112, the image buffer 80 is filled with n bytes of a ROM image.

The ROM image may be resident to the computer system S or may be delivered to the computer system S. Details concerning remote and secure packaging and delivery of a ROM image are provided in commonly-assigned U.S. patent application Ser. No. 09/,070,942, "METHOD AND APPARATUS FOR REMOTE ROM FLASHING AND SECURITY MANAGEMENT FOR A COMPUTER SYSTEM," previously incorporated by reference. It should be understood that the software of the present invention may be stored on a processor readable medium external to the computer system S and then delivered to a processor readable medium internal to the computer system S. Wle the present invention is illustrated in the context of a computer system, it should be understood that the techniques according to the present invention may be implemented in other systems which also contain flash memory.

From step 112, control proceeds to step 114 where a hash of the image buffer 80 is calculated. The hash is placed in the message digest parameters, msg_digest_0, msg_digest_1, msg_digest_2, and msg_digest_,3. In the disclosed embodiment, the hash is a MD5 hash of the conventional type. The design of a routine for calculating a MD5 hash is known in the art. The message digest is preferably at least a 128-bit hash code.

Next, in step 115, a flash-in-progress CMOS bit is set. Setting the flash-in-progress CMOS bit is performed by calling a tri-modal INT15H function, INT15 (AX=0E822H, BL=04H). The INT15H function is a call to the flash BIOS interface 74 (FIG. 3A). The flash-in-progress CMOS bit identifies the current state of the ROM image in the system ROM 30. For this function, entry register variable AX is equal to 0E822H and entry variable BL is equal to 04H. If the flash-in-progress CMOS bit is successfully set, the carry flag is set equal to 0, and AH is set equal to 00. If the flash-in-progress CMOS bit is not successfully set, the carry flag is set equal to 1, and AH returns an error code.

Next, in step 116, the ROM_FLASH routine 100 calls the flash BIOS interface 74 to flash a ROM image. The flash is performed by calling a tri-modal INT15H function, INT15 (AX=0E822H, BL=0AH). The entry variables for the function include an entry register variable AX set to 0E822H and an entry register variable BL set to 0AH. If the function is successful, the carry flag is set to 0 and the output variable AH is set to 00. If the function fails, the carry flag is set to 1. Two circumstances in which the function may fail include a failure to locate the image header 82 and an actual flash failure.

Control then proceeds to step 117 where the flash-in-progress CMOS bit is cleared. Clearing of the flash CMOS bit is performed by calling an INT15H function INT15 (AX=E822H, BL=05H). The INT15H function is a call to the flash BIOS interface 74 (FIG. 3A). For this function, the entry variable AX is equal to E822H, and entry level variable BL is equal to 05H. If the flash-in-progress CMOS bit is successfully cleared, the carry flag is equal to 0 and AH returns a 00H. If the flash-in-progress CMOS bit is not successfully cleared, then the carry flag returns a 1 and AH returns an error code.

Next, in step 120, the image_offset parameter is incremented by n. Control then proceeds to step 122 where it is determined if the image_offset parameter is equal to the total size of the ROM image. If the image_offset parameter is not equal to the total size of the ROM image, then control returns to step 110. A portion of the ROM image may be flashed iteratively until the entire ROM image is flashed. When an entire ROM image is flashed, the image_offset parameter is equal to the total ROM image size. If it is determined in step 122 that the entire ROM image is flashed, then control terminates through step 124.

Figure 5A:
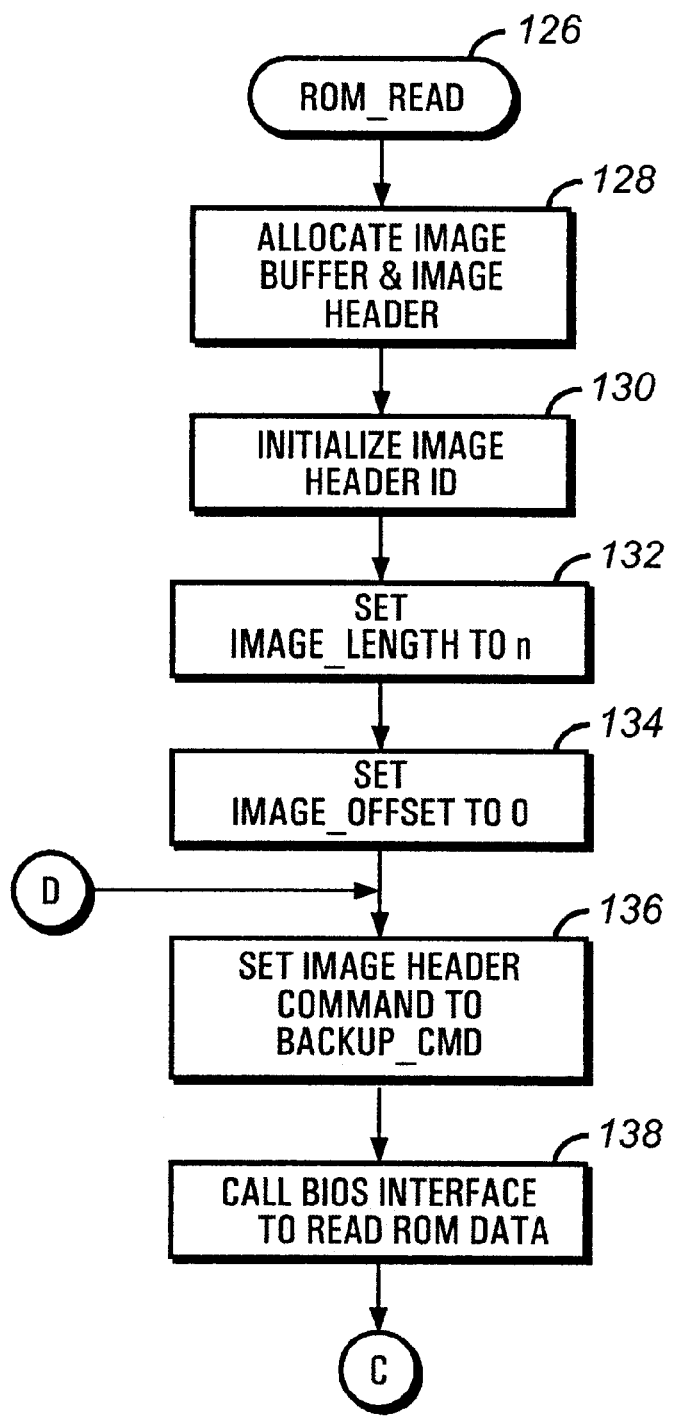
FIGS. 5A and 5B are flow charts of an exemplary ROM_READ routine in accordance with the present invention.
Figure 5B:
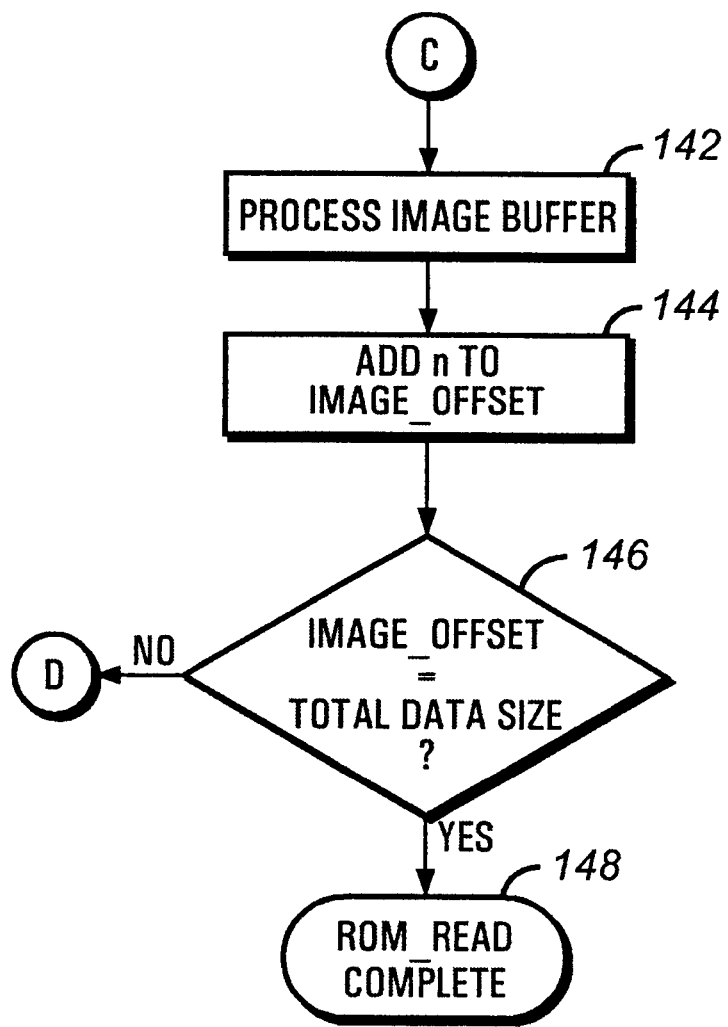

Referring to FIGS. 5A and 5B, an exemplary ROM_READ routine 126 for a ROM reading process in accordance with the present invention is shown. The ROM_READ routine 126 is performed in the flash driver 72 (FIG. 3A). Beginning at step 128 (FIG. 5A), the image buffer 80 and image header 82 (FIG. 3B) are allocated. Next, in step 130, the image header or signature 82 is initialized by setting the image header 82 to "ROMIMAGE." Control next proceeds to step 132 where the image_length parameter is set to n. Following step 132, the image_offset parameter is set to 0 in step 134. Control next proceeds to step 136 where the command parameter is set to BACKUP_CMD representing a command to perform a read operation. Next, in step 138, the flash BIOS interface 74 is called to read data from the system ROM 30.

Control next proceeds to step 142 (FIG. 5B) where the image buffer 80 is processed. Processing the image buffer 80 may include data manipulation operations of data within the image buffer 80. Control then proceeds to step 144 where the image_offset parameter is incremented by n. Next, in step 146, it is determined if the image_offset parameter is equal to the total data size. If not, control loops back to step 136. The system ROM 30 may be read iteratively until the entire data of interest is read. When the entire data is read, the image_offset parameter is equal to the total data size. If it is determined in step 146 that the entire data of interest is read, then control terminates through step 148.

Figure 6:
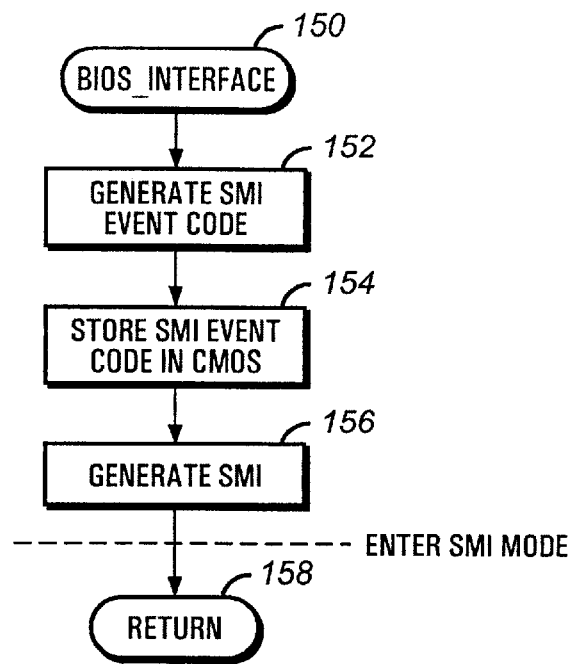
FIG. 6 is a flow chart of an exemplary BIOS_INTERFACE routine in accordance with the present invention.

Referring to FIG. 6, a flow chart of an exemplary BIOS_INTERFACE routine 150 is shown. The BIOS_INTERFACE routine 150 is a flash BIOS interface called by the flash driver 72 (FIG. 3). Beginning in step 152, an SMI event code is generated. From step 152, control proceeds to step 154 where an SMI event code is stored in the CMOS memory 34 (FIG. 2). Next, in step 156, an SMI is generated. From step 156, control returns through step 158. In the disclosed embodiment, the BIOS_INTERFACE routine 150 is an INT 15 BIOS routine.

Figure 7:
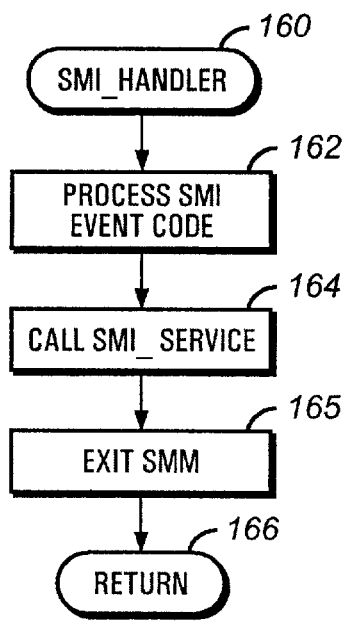
FIG. 7 is a flow chart of an exemplary SMI_HANDLER routine in accordance with the present invention.

Referring to FIG. 7, a flow chart of an exemplary SMI_HANDLER routine 160 is shown. Control is transferred from the BIOS_INTERFACE routine 150 to the SMI_HANDLER routine 160 upon entry into SMM. Beginning in step 162, the SMI event code in the CMOS memory 34 is processed. The SMI event code directs the SMI_HANDLER routine 160 to call a BIOS SMI service routine. Control next proceeds to step 164 where a BIOS SMI service routine is called.

Figure 8:
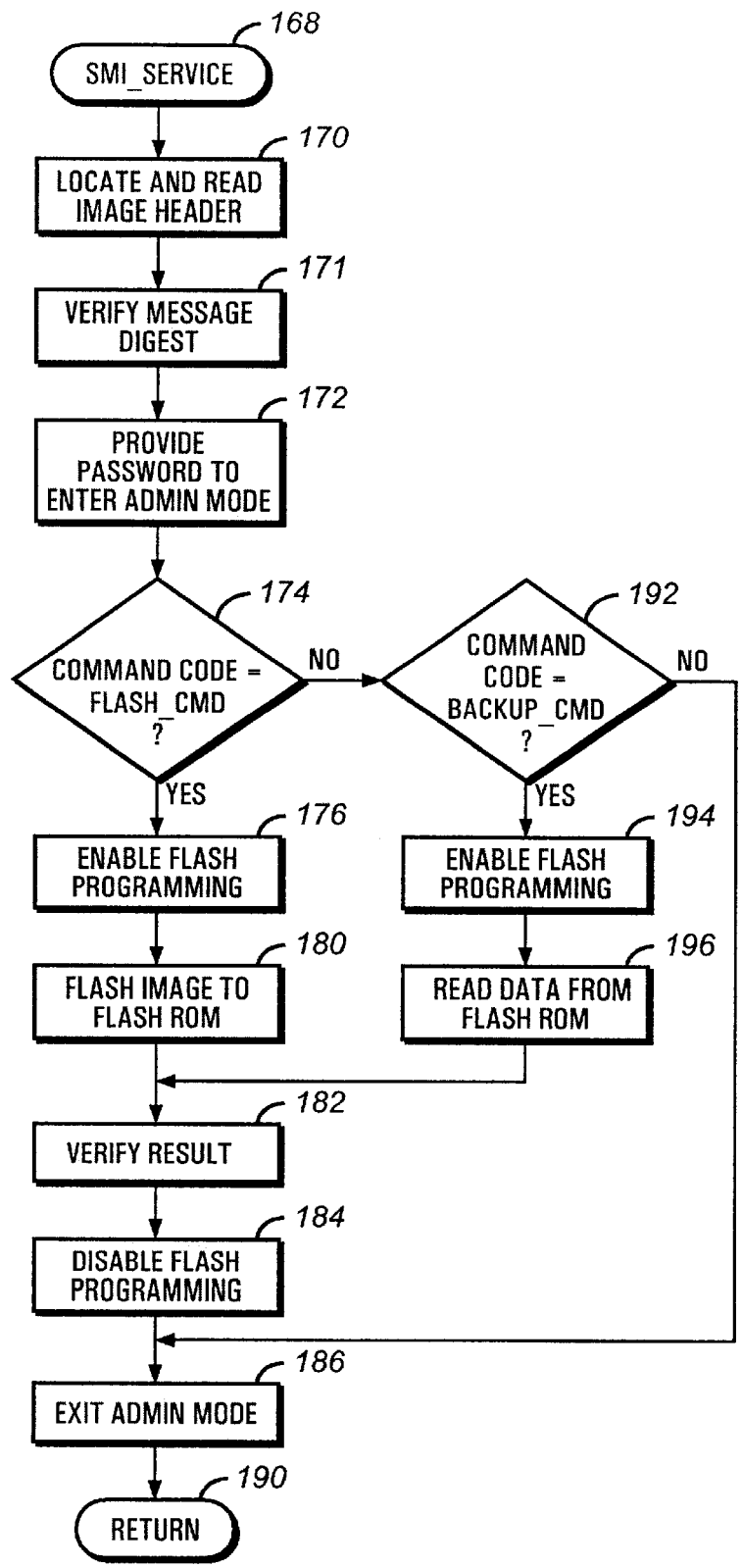
FIG. 8 is a flow chart of an exemplary SMI_SERVICE routine called by the SMI_HANDLER routine of FIG. 7 in accordance with the present invention.

Referring to FIG. 8, a flow chart of an exemplary SMI_SERVICE routine 168 is shown. Beginning in step 170, the image header 82 (FIG. 3B) is located and read. Next, in step 171, the message digest, if utilized, is verified. From step 171, control proceeds to step 172 where a flash ROM password, such as an administrator password read from the image header 82, is provided to place the computer system S in an administrator mode. In the disclosed embodiment, the flash ROM password is further provided to the black box 52 within the security ASIC 48 (FIG. 2). If the flash ROM password matches the password stored in the black box 52 for controlling access to the system ROM 30, then the system ROM 30 (FIG. 1 and 3B) is placed in an unlocked state. If a password is not present in the image header 82, then a default password is provided.

Control then proceeds to step 174 where it is determined if the command parameter is set to FLASH_CMD. If the command parameter is set to FLASH_CMD, then control proceeds to step 176 where programming of the system ROM 30 is enabled. In the disclosed embodiment, the flash ROM programming is enabled by a function call. The function call sets bits in a register in the ISA bridge 24 to allow access to the system ROM 30. Specifically, a lower BIOS enable bit in the ISA bridge 24 is set to allow decoding of the full system ROM 30, and a BIOSCS# write protect bit in the ISA bridge 24 is set to allow writes to the system ROM 30.

Next, in step 180, an image is flashed to the system ROM 30. The algorithm for flashing the system ROM 30 is specific to the particular flash ROM implemented. The algorithm includes an erase sequence for erasing a portion of the system ROM 30 followed by a programming sequence for programming the system ROM 30. Details concerning flashing an ESCD sector of a system ROM are provided in commonly-assigned U.S. patent application Ser. No. 09/070, 866, entitled "METHOD AND APPARATUS FOR FLASHING ESCD AND VARIABLES INTO A ROM," Case No. A97274US, which is hereby incorporated by reference in its entirety.

If the command parameter is not set to FLASH_CMD, then control proceeds from step 174 to step 192 where it is determined if the command parameter is set to BACKUP_CMD. BACKUP_CMD represents a command for a read operation. If the command parameter is not set to BACKUP_CMD, then control proceeds to step 186. Next, in step 194, programming of the system ROM 30 is enabled as described in step 176. From step 194, control proceeds to step 196 where data is read from the system ROM 30. From step 196 and step 180, control proceeds to step 182. In step 182, the result of the ROM operation is verified. Next, control proceeds to step 184 where flash programming of the system ROM 30 is disabled. In the disclosed embodiment, flash ROM programming is disabled by a function call. The function call clears bits in a register in the ISA bridge 24 to block access to the system ROM 30. Specifically, a lower BIOS enable bit in the ISA bridge 24 is cleared to disable decoding of the system ROM 30, and a BIOSCS# write protect bit is cleared to block writes to the system ROM 30.

From step 184, control proceeds to step 186 where the computer system S exits the administrator mode. In the disclosed embodiment, a command and the flash ROM password is provided to the blackbox command register 58 for returning the system ROM 30 to a locked or protected state. From step 186, the SMI_SERVICE routine 68 returns through step 190. Returning to FIG. 7, the SMI_HANDLER routine 60 then proceeds from step 164 to step 165 where the SMI_HANDLER routine 60 exits the SMM. Control returns from step 165 through step 166.

The foregoing disclosure and description of the invention are illustrative and explanatory thereof, and various changes in the number of variables, number of parameters, order of steps, field sizes, data types, code elements, code size, connections, components, and materials, as well as in the details of the illustrated hardware and software and construction and method of operation may be made without departing from the spirit of the invention.

We claim:

1. A method of flashing a non-volatile memory image to a non-volatile memory of a computer system independently of an operating system, comprising the steps of:

allocating an image buffer in a volatile memory of the computer system;

allocating an image header in the volatile memory wherein the image header comprises a pointer to the image buffer;

filing the image header with data concerning the image buffer;

loading the image buffer with a portion of the non-volatile memory image;

calling BIOS interface code to generate a system management interrupt causing the computer system to enter a system management mode;

locating the image buffer during the system management mode; and flashing the portion of the non-volatile memory image to the non-volatile memory during the system management mode.

2. A method of flashing a non-volatile memory image to a non-volatile memory of a computer system independently of an operating system, comprising the steps of:

allocating an image buffer in a volatile memory of the computer system;

allocating an image header in the volatile memorg wherein the image header comprises an offset into the non-volatile memory associated with the image buffer;

filling the image header with data concerning the image buffer;

loading the image buffer with a portion of the non-volatile memory image;

calling BIOS interface code to generate a system management interrupt causing the computer system to enter a system management mode;

locating the image buffer during the system management mode; and flashing the portion of the non-volatile memory image to the non-volatile memory during the system management mode.

3. A method of flashing a non-volatile memory image to a non-volatile memory of a computer system independently of an operating system, comprising the steps of:

allocating an image buffer in a volatile memory of the computer system;

allocating an image header in the volatile memory wherein the image header comprises a lengh of the image buffer;

filling the image header with data concerning the image buffer;

loading the image buffer with a portion of the non-volatile memory image;

calling BIOS interface code to generate a system management interrupt causing the computer system to enter a system management mode;

locating the image buffer during the system management mode; and flashing the portion of the non-volatile memory image to the non-volatile memory during the system management mode.

4. A method of flashing a non-volatile memory image to a non-volatile memory of a computer system independently of an operating system, comprising the steps of:

allocating an image buffer in a volatile memory of the computer system;

allocating an image header in the volatile memory wherein the image header comprises an administrator password for providing access to the non-volatile memory;

filling the image header with data concerning the image buffer;

loading the image buffer with a portion of the non-volatile memory image;

calling BIOS interface code to generate a system management interrupt causing the computer system to enter a system management mode;

locating the image buffer during the system management mode; and flashing the portion of the non-volatile memory image to the non-volatile memory during the system management mode.

5. A method of flashing a non-volatile memory image to a non-volatile memory of a computer system independently of an operating system, comprising the steps of:

allocating an image buffer in a volatile memory of the computer system;

allocating an image header in the volatile memory wherein the image header comprises a message digest of the image buffer for validating the image buffer;

filling the image header with data concerning the image buffer;

loading the image buffer with a portion of the non-volatile memory image;

calling BIOS interface code to generate a system management interrupt causing the computer system to enter a system management mode;

locating the image buffer during the system management mode; and flashing the portion of the non-volatile memory image to the non-volatile memory during the system management mode.

6. A method of reading data from a non-volatile memory of a computer system independently of an operating system, comprising the steps of:

allocating an image buffer in a volatile memory of the computer system;

allocating an image header in the volatile memory wherein the image header comprises a pointer to the image buffer;

filling the image header with data concerning the image buffer;

calling BIOS interface code to generate a system management interrupt causing the computer system to enter a system management mode;

locating the image buffer during the system management mode; and copying data from the non-volatile memory to the image buffer during the system management mode.

7. A method of reading data from a non-volatile memory of a computer system independently of an operating system, comprising the steps of:

allocating an image buffer in a volatile memory of the computer system;

allocating an image header in the volatile memory wherein the image header comprises an offset into the non-volatile memory associated with the image buffer;

filling the image header with data concerning the image buffer;

calling BIOS interface code to generate a system management interrupt causing the computer system to enter a system management mode;

locating the image buffer during the system management mode; and copying data from the non-volatile memory to the image buffer during the system management mode.

8. A method of reading data from a non-volatile memory of a computer system independently of an operating system, comprising the steps of:

allocating an image buffer in a volatile memory of the computer system;

allocating an image header in the volatile memory wherein the image header comprises a length of the image buffer;

filling the image header with data concerning the image buffer;

calling BIOS interface code to generate a system management interrupt causing the computer system to enter a system management mode;

locating the image buffer during the system management mode; and copying data from the non-volatile memory to the image buffer during the system management mode.

9. A method of reading data from a non-volatile memory of a computer system independently of an operating system, comprising the steps of:

allocating an image buffer in a volatile memory of the computer system;

allocating an image header in the volatile memory wherein the image header comprises an administrator password for providing access to the non-volatile memory;

filling the image header with data concerning the image buffer;

calling BIOS interface code to generate a system management interrupt causing the computer system to enter a system management mode;

locating the image buffer during the system management mode; and copying data from the non-volatile memory to the image buffer during the system management mode.

10. A method of reading data from a non-volatile memory of a computer system independently of an operating system, comprising the steps of:

allocating an image buffer in a volatile memory of the computer system;

allocating an image header in the volatile memory wherein the image header comprises a message digest of the image buffer for validating the image buffer;

filling the image header with data concerning the image buffer;

calling BIOS interface code to generate a system management interrupt causing the computer system to enter a system management mode;

locating the image buffer during the system management mode; and copying data from the non-volatile memory to the image buffer during the system management mode.

11. A method of reading data from a non-volatile memory of a computer system independently of an operating system, comprising the steps of:

allocating an image buffer in a volatile memory of the computer system;

calling BIOS interface code to generate a system management interrupt causing the computer system to enter a system management mode;

locating the image buffer during the system management mode; and copying data from the non-volatile memory to the image buffer during the system management mode.

12. The method of claim 11, the non-volatile memory image having a plurality of portions, the data being a portion of a non-volatile memory image, further comprising the steps of:

detecting if each portion of the non-volatile memory image is copied from the non-volatile memory to the image buffer; and calling BIOS interface code to generate a system management interrupt and copying a next portion of the non-volatile memory image from the non-volatile memory to the image buffer during the system management mode if each portion of the non-volatile memory image is not copied from the non-volatile memory.

13. The method of claim 12, further comprising the step of:

exiting system management mode if each portion of the non-volatile memory image is copied from the non-volatile memory to the image buffer.

14. The method of claim 11, further comprising the step of:

exiting system management mode after the step of copying data from the non-volatile memory to the image buffer.

15. The method of claim 11, further comprising the step of:

allocating an image header in the volatile memory; and filling the image header with the data concerning the image buffer.

16. The method of claim 15, the step of locating the image buffer comprising the step of:

scanning the volatile memory to locate the image header.

17. The method of claim 16, further comprising the step of: reading the image header.

18. The method of claim 11, wherein the image header comprises a ROM command.

19. The method of claim 16, wherein the non-volatile memory is a read-only memory.

20. The method of claim 11, the copying step comprising the step of:

copying data from the non-volatile memory to the image buffer with system management interrupt code.

21. The method of claim 11, wherein the data is a portion of a non-volatile memory image.

22. The method of claim 11, wherein the data is non-volatile memory version data.

23. A method of providing a memory command to a non-volatile memory of a computer system independently of an operating system, the computer system including a secure memory device and a volatile memory having an image buffer and an image header, the non-volatile memory having a locked state, comprising the steps of:

placing the computer system in a system management mode;

locating the image buffer and the image header during the system management mode;

reading the image header during the system management mode, the image header including a password and a memory command;

providing the password from the image header to the secure memory device during the system management mode to place the non-volatile memory in an unlocked state; and providing the memory command from the image header to the non-volatile memory during the system management mode.

24. The method of claim 23, wherein the secure memory device contains a password for unlocking the non-volatile memory and for comparison to the password provided to the secure memory device.

25. The method of claim 23, further comprising the step of:

executing the memory command.

26. The method of claim 25, further comprising the step of:

causing the computer system to exit the system management mode.

27. The method of claim 23, wherein the memory command is a flash programming command for flashing a portion of a non-volatile memory image in the image buffer to the non-volatile memory.

28. The method of claim 23, wherein the memory command is a read command for copying data from the non-volatile memory to the image buffer.

29. The method of claim 23, wherein the non-volatile memory is a read-only memory.

* * * * *

UNITED STATES PATENT AND TRADEMARK OFFICE
CERTIFICATE OF CORRECTION

PATENT NO.   : 6,243,809 B1
DATED        : June 5, 2001
INVENTOR(S)  : Patrick L. Gibbons et al.

It is certified that error appears in the above-identified patent and that said Letters Patent is hereby corrected as shown below:

Column 10,
Lines 30 and 31, the sentence starting "Next, in step 194" should start a new paragraph.

Column 11,
Line 22, delete "memorg" and insert therefor -- memory --.

Signed and Sealed this

Twenty-ninth Day of November, 2005

JON W. DUDAS
*Director of the United States Patent and Trademark Office*